US006238005B1

(12) United States Patent
Sugayauchi et al.

(10) Patent No.: US 6,238,005 B1
(45) Date of Patent: May 29, 2001

(54) WHEEL BALANCE WEIGHT

(75) Inventors: Tatsuhiko Sugayauchi, Toyota; Osamu Yamaguchi, Okazaki, both of (JP)

(73) Assignees: Taiho Kogyo Co., Ltd, Toyota; Toho Kogyo Co., Ltd., Aichi-ken, both of (JP)

( * ) Notice: Subject to any disclaimer, the term of this patent is extended or adjusted under 35 U.S.C. 154(b) by 0 days.

(21) Appl. No.: 09/416,046

(22) Filed: Oct. 12, 1999

(30) Foreign Application Priority Data

Oct. 12, 1998 (JP) ..................................... 10-289865

(51) Int. Cl.[7] ..................................... B60B 1/00
(52) U.S. Cl. ..................................... 301/5.21
(58) Field of Search ..................................... 301/5.21, 53.5

(56) References Cited

U.S. PATENT DOCUMENTS

D. 132,030 * 4/1942 Kalajian ..................................... 301/5.21
D. 161,006 * 11/1950 Dailey ..................................... 301/5.21
2,122,065 * 6/1938 Hume ..................................... 301/5.21
2,197,364 * 4/1940 Hatch ..................................... 301/5.21
2,218,410 * 10/1940 Weaver ..................................... 301/5.21
2,248,265 * 7/1941 Wright ..................................... 301/5.21
2,258,011 * 10/1941 Inman ..................................... 301/5.21
2,469,997 * 5/1949 Simpson ..................................... 301/5.21
2,522,039 * 9/1950 Jacobsen et al. ..................................... 301/5.21
2,548,842 * 4/1951 McCrorey ..................................... 301/5.21
2,576,724 * 11/1951 Pouell ..................................... 301/5.21
3,633,263 * 1/1972 Hoeksema ..................................... 301/5.21
3,688,380 * 9/1972 Hofmann et al. ..................................... 301/5.21

FOREIGN PATENT DOCUMENTS 62-70001 5/1987 (JP) .
3046046 11/1997 (JP) .

OTHER PUBLICATIONS

Germany Patent 3,642,369 A1, Jun.16,1988.*

* cited by examiner

*Primary Examiner*—S. Joseph Morano
*Assistant Examiner*—Long Bao Nguyen
(74) *Attorney, Agent, or Firm*—Jacobson, Price, Holman & Stern, PLLC

(57) ABSTRACT

A wheel balance weight attached to a wheel of an automobile. The weight body has an engaging groove with which one end portion of the engaging member engages. Opened end portions of the weight body defining the engaging groove are caulked over the one end portion to form pawl portions. Thus, the one end of the engaging member is fixed to the engaging groove of the weight body.

6 Claims, 6 Drawing Sheets

3
33
1
12
31
12

WHEEL BALANCE WEIGHT

BACKGROUND OF THE INVENTION

1. Field of the Invention

This invention relates to a wheel balance weight attached to a wheel of an automobile.

2. Related Art

In a wheel assembly in which a tire of an automobile and the like is assembled into a rim of a wheel, if an unbalance of the wheel assembly in a circumferential direction around a rotating shaft or in an axial direction becomes larger, various defects such as a vibration or a noise will be generated in running of the automobile. These vibration and noise are resulted from the unbalance of the wheel, and a wheel balance weight is attached to the wheel to remove the unbalance.

A conventional wheel balance weight is comprised of a weight body made of a lead or a lead alloy and has a predetermined weight, and a clip for fixing the weight body to the wheel. The weight body and the clip are integrally formed by a casting. The lead or lead alloy constituting the weight body is selected due to a large specific gravity thereof and a soft, adaptable character thereof to a curved surface of the wheel. However, since the material containing the lead has a problem in an influence to a natural environment, the wheel balance weight which has the weight body made of an iron or an alloy of iron has been developed. Concretely, the wheel balance weight comprised of the weight body made of the iron or the iron alloy, and an engaging member made of a steel plate and bent so that one end portion thereof is fixed to the weight body and other end thereof is bent to nip a periphery of a rim portion of the wheel therein.

As the conventional wheel balance weight, Japanese U.M. No.3046046 discloses a wheel balance weight comprised of a weight body made of a cast iron, and an engaging member made of a steel plate bent and fixed to the weight body by a rivet. On the other hand, Japanese U.M. Laid-open (Koukai) No.62-70001 discloses a wheel balance weight comprised of a weight body having a recessed groove on a bottom surface on which a protruded portion is formed, and an engaging member having a through-hole at one end thereof to be fixed to the weight body. The engaging member is fixed to the weight body by penetrating the protruded portion through the through-hole and caulking a head or top portion of the protruded portion over the engaging portion.

However, the wheel balance weight disclosed in Japanese U.M. No.3046046 has an disadvantage that the numbers of parts and a manufacturing cost of the wheel balance weight increase, since the engaging member is fixed to the weight body by riveting. On the other hand, the wheel balance weight disclosed in Japanese U.M. Laid-open No.62-70001 has an disadvantage that the fixing of the engaging member to the weight body is not sufficient, since only a top of the protruded portion is engaged with a periphery of the through-hole. Also, the manufacturing cost of the weight body increases due to of the protruded portion formed within the recessed groove.

SUMMARY OF THE INVENTION

The present invention is made in view of the above mentioned circumstances, and has an object to provide the wheel balance weight in which the engaging member can be fixed to the weight body sufficiently and firmly.

In order to achieve the above object, inventors of this application has studied a fixing manner or method of the engaging member to the weight body, and found that, pawl portions on the weight body formed by caulking opened end portions where an engaging groove opens to engage with the one end portion is effective to fix the engaging member to the weight body.

That is, the wheel balance weight attached to the wheel rim portion is comprised of 1) a weight body having an engaging groove formed at a part thereof, and caulkable opened end portions defining said engaging groove; and 2) an engaging member formed by bending a metallic plate so that of which one end portion is to be fixed to said engaging groove said weight body and of which other end nips a periphery of said rim of wheel. Said engaging member is fixed to said engaging groove of said weight body by pawl portions formed by caulking said opened end portions over said one end portion in a state where said one end portion is engaged with the engaging groove.

According to the wheel balance weight of the present invention, the engaging member can fixed to the weight body by caulking the both opened end portions of the weight body onto the one end portion, so that the engaging member can be fixed to the weight body firmly.

The present invention can include various embodying modes, as follows.

The weight body which constitutes the wheel balance weight has the engaging groove with which one end portion of the engaging member engages. This engaging groove is opened in a width corresponding to a width of the one end portion of the engaging member. One end portion of the engaging member is fixed to the engaging groove, in the state where one end portion is engaged with the engaging groove of the weight body, by caulking the opened end portions over one end portion to form the pawl portions. Thus, one end portion of the engaging member is fixed to the engaging groove at opposite sides thereof to increase or widen the fixing portions, so that the engaging member can firmly fixed to the weight body.

The weight body preferably has, at the opened end portions of the engaging groove, a protruded portion(s) protruded from the opened surface of the engaging groove in a thickness direction along side wall surfaces thereof to be caulked. This protruded portions make the formation of the pawl portions protruded toward the engaging groove to fix the engaging member easier, that is, the caulking operation of the opened end portion for the fixing becomes more simple.

The weight body preferably has a first guiding portion protruding in a longitudinal direction into the engaging groove at the side wall surface defining the engaging groove, while one end portion of the engaging member preferably has a second guiding portion to be guided by the first guide portion. Thus, the engaging member is guided by the first and second guiding portions and positioned smoothly, when it is fixed to the weight body.

The first guiding portion is preferably a protruded portion or a recessed portion formed by protruding or recessing the side wall surfaces. Preferably, the first guiding portion is formed at the side wall surfaces near to the bottom wall surface to extend in a depth direction of the engaging groove from the bottom wall surface to the opened surface. The second guiding portion is complementary to the first guiding member. That is, when the first guiding member is protruded or convex, the second guiding member is recessed or concave. By such complementary relation, the first guiding member is smoothly guided by the second guiding member in the depth direction of the engaging groove.

Also, the weight body preferably has a positioning emboss protruding in the thickness direction from the bottom wall surface of the engaging groove, while one end portion of the engaging member preferably has the through-hole through which the emboss penetrates. The top portion of the emboss is preferably caulked. Further, the weight body can have deeper grooves at both end of the engaging groove.

The weight body adjusts the weight of the wheel balance weight, and can be manufactured by an iron steel and the like, by the iron preferably. The wire material of constant cross-section is cut by the predetermined length, and then subject to a cold-forging, for manufacturing the weight body.

The engaging member preferably which constitutes the balance weight has one end portions opposing to the bottom wall surface of the engaging groove and being bent at both side edge portions thereof toward the weight body. In this case, the engaging groove preferably has a protruded portion at a central portion of the bottom surface, corresponding to the cross-sectional shape of one end portion. In detail, the bend or curvature of the side edge portions of one end portion toward the bottom surface of the engaging groove prevents the pawl portion from protruding from the surface of the engaging groove, and broaden a contacting area of the wheel balance weight to the rim portion when the wheel balance weight is attached to the wheel.

It is preferable for the engaging member that one end portion thereof has a duplicate or folded construction formed by folding back an end of the engaging member by 180 degrees, and one end portion has a reduced width by removing or cutting the side edge portions thereof. A space formed by removing the side edge portions of the one end portion can be used for containing the pawl portions. The engaging portion is formed by bending the metallic plate by a press-forming, and is comprised of one end portion to be fixed to the weight body, and other end portion bent into an arch shape to nip the peripheral portion of the wheel rim. The engaging portion is preferably manufactured by the steel plate, and preferably has a resilience given by quenching.

The wheel balance weight of the present invention has preferably has a coated or sprayed layer on an surface thereof, to prevent a deterioration due to a generation of rust on the weight body and/or the engaging member. For example, zinc chromate film can be formed on the balance weight.

When manufacturing the wheel balance weight of the present invention, the one end portion of the engaging member formed by bending the metallic plate by the pressing is engaged with the engaging groove formed in the weight body, and then caulking the opened end portions defining the engage groove over one end portion portion to form the caulked portion.

PREFERRED EMBODIMENT OF THE INVENTION

Hereinafter, preferred embodiment of the present invention will be explained with reference to attached drawings. It is noted however that the present invention is not limited to these embodiments, but includes various modifications and deformations.

The weight body of each embodiment is manufactured by cutting an iron rod (ss400, s10c and equivalent thereto) by a predetermined length, and being subjected to a cold-forging. The engaging member is manufactured by punching a steel plate (sK7, 6, 5, s60CM, s65CM and equivalent thereto) by a predetermined shape, bending it by a press-forming, and being subjected to a heat-treatment. The wheel balance weight is subjected to a zinc chromate treatment, baked-type zinc chromic acid composite film, or silver powder spraying. In addition, the wheel balance weight has, at the bent portion abutted to the wheel rim portion, an opened small hole(s).

<Embodiment 1>

Figure 1:
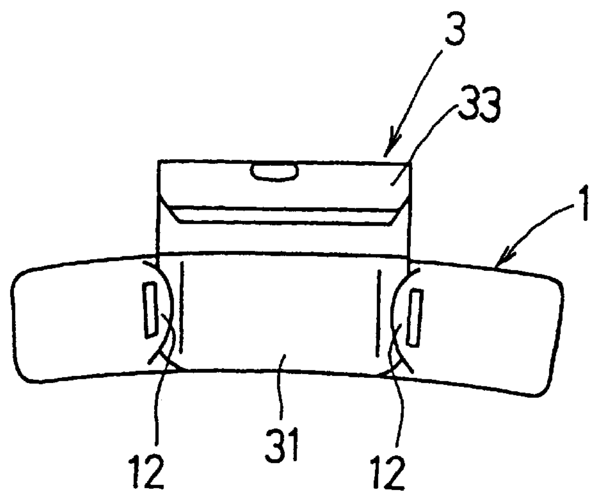
FIG. 1 is a plan view of a wheel balance weight of a first embodiment.
Figure 2:
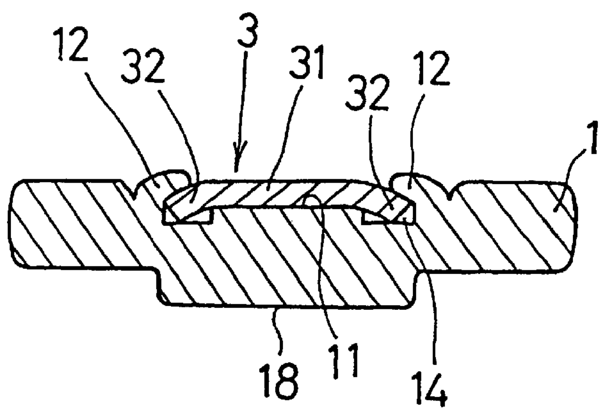
FIG. 2 is a cross-section of the wheel balance weight of the first embodiment.

A first embodiment of the wheel balance weight is shown in FIGS. 1 and 2, in which FIG. 1 is a plan view of the wheel balance weightand FIG. 2 is a cross-section of the same.

This wheel balance weight is comprised of a weight body 1 and an engaging member 3. The weight body 1 is manufactured by cold-forging the rod steel cutted by a predetermined length, and has an opened engaging groove 11 at an upper surface thereof. The engaging groove 11 has a predetermined width (up/down direction in FIGS. 1 and 2) in a longitudinal direction (right/left direction in FIGS. 1 and 2) of the weight body 1 and depth (up/down direction in FIG. 2), and extend in full width (up/down direction in FIG. 1) of the weight body 1. The engaging groove 11 is defined by a bottom wall surface 11*a*, a pair of side wall surfaces 11*b*, and an opened surface 11*c*. The weight body 1 also has a low protruded bead 18 at a lower surface thereof. The engaging groove 11 has, at both ends or sides thereof, a pair of deep grooves 14 deeper than the engaging groove 11. At both opened ends of the opened space defining the engaging groove 11, a pair of protruded portions 13 protruding from the opened surface 11*c* along the side wall surfaces lib are formed.

The engaging member 3 is comprised of one end portion 31 to be fixed into the engaging portion 11 of the weight body 1, and a bent portion 33 extending from one end portion 31 and being opened to nip a periphery of a rim portion of the wheel. Both side edges of the one end portion 31 are bent to be remote away from the wheel (downwardly in FIG. 2) to form sloped side edge portions 32. When the one end portion 31 of the engaging portion 3 is fixed to the engaging groove 11 of the weight body 1, the sloped side edge portions 32 of the one end portion 31 is fitted into the deep grooves 14 of the engaging grooves 11. Then, back portions of the portions 13 are caulked, and the caulked portions and the protruded portion 13 are pushed over the sloped side edge portions 32 of the one end portion 31 to form pawl portions 12. In this way, the one end portion 31 of the engaging portion 3 is fixed into the engaging groove 11 of the weight body 1.

Figure 3:
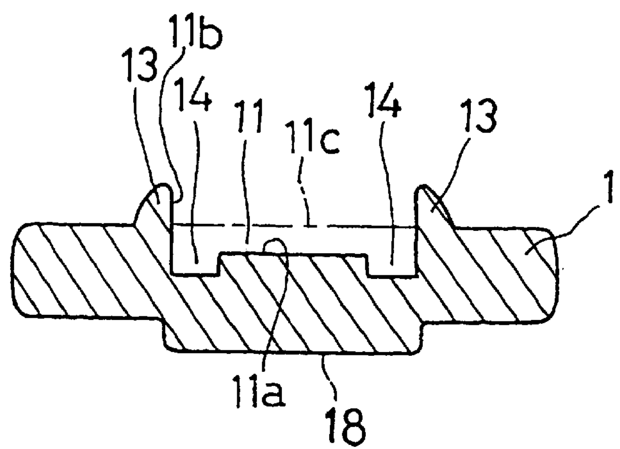
FIG. 3 is a cross-section of a counter weight used in the first embodiment.

Here, the protruded bead 18 shown in FIGS. 2 and 3 and protruded from the back (lower) surface of the weight body 1 is formed to make cold-forging the weight body 1 easier. So, this protruded bead 18 can be omitted in manufacturing the weight body 1.

According to the wheel balance weight of this embodiment, in the state where the one end portion 31 of the engaging member 3 is fitted into the engaging groove 11 of the weight body 1, the protruded portion 13 at the both side portions defining the engaging groove 11 are caulked to form the pawl portions 12. The pawl portions 12 press the sloped side edge portions 32 of the one end portion 31 fitted into the deep grooves 15 in the engaging groove 11. In this way, in this wheel balance weight, the engaging member 3 is fixed to the weight body 1 firmly.

Figure 14:
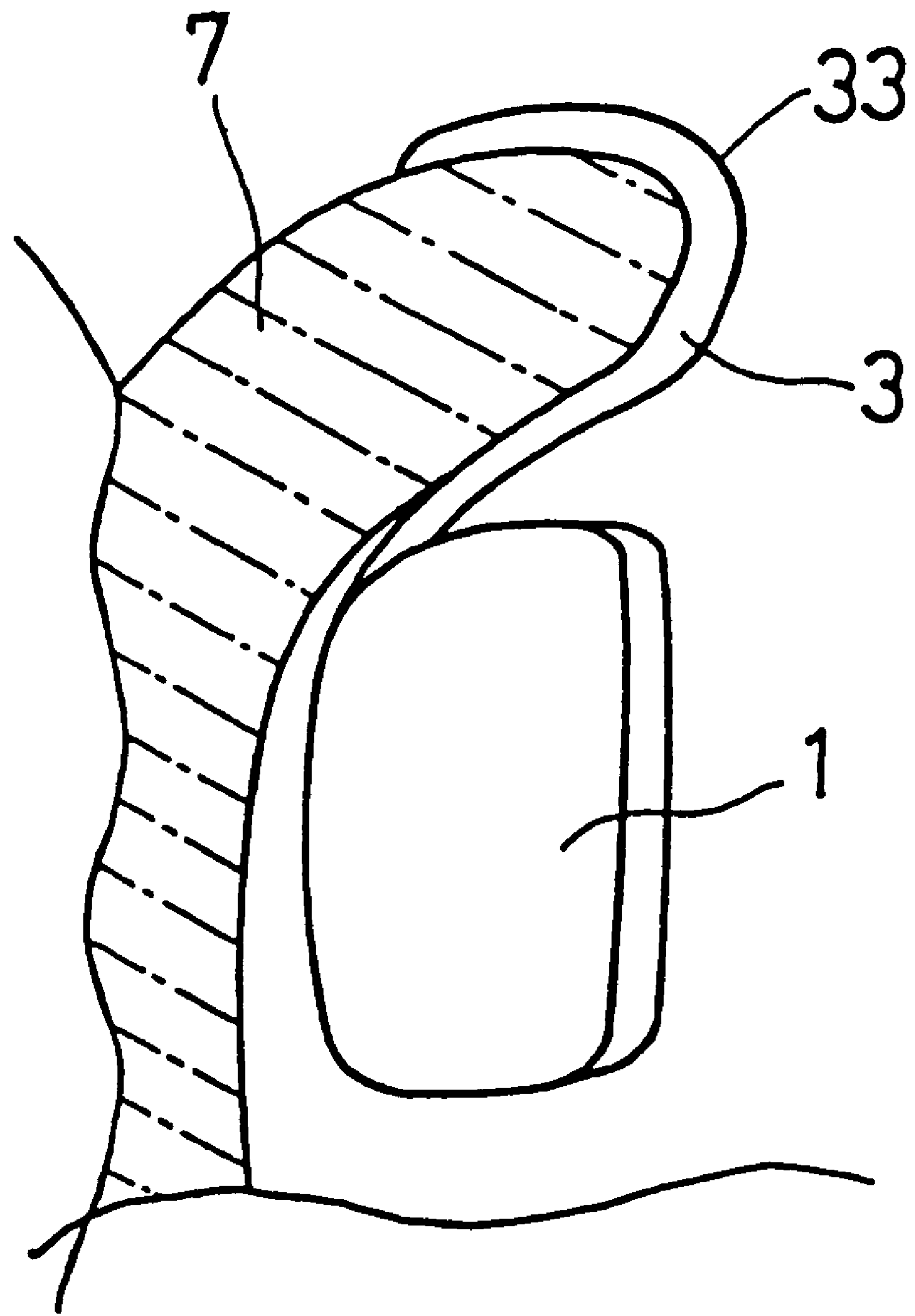
FIG. 14 is an enlarged explanatory view for explaining a fixed state of the wheel balance weight to a wheel rim portion.

Here, as shown in FIG. 14, the wheel balance weight of this embodiment is attached to a rim portion 7 of wheel. That is, each of the wheel balance weights is attached to the wheel by nipping a periphery of the rim portion 7 with the bent portion 33 of the engaging member 3 which has a bent or curvature coinciding the periphery of the rim portion 7.

The wheel balance weights in the following second to fifth embodiments are attatched to the wheel rim portion 7 in the same manner.

<Second Embodiment>

Figure 4:
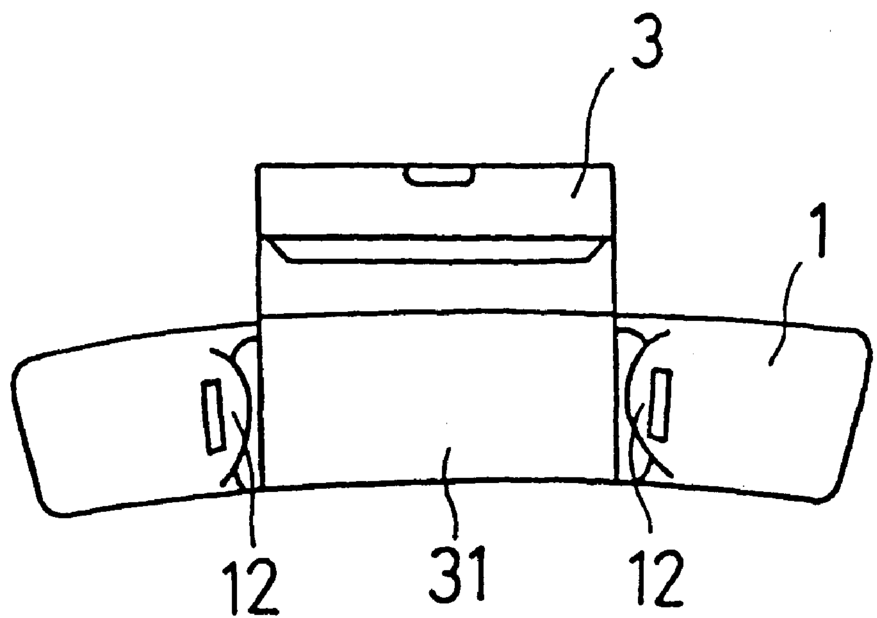
FIG. 4 is a plan view of a wheel balance weight of a second embodiment.
Figure 5:
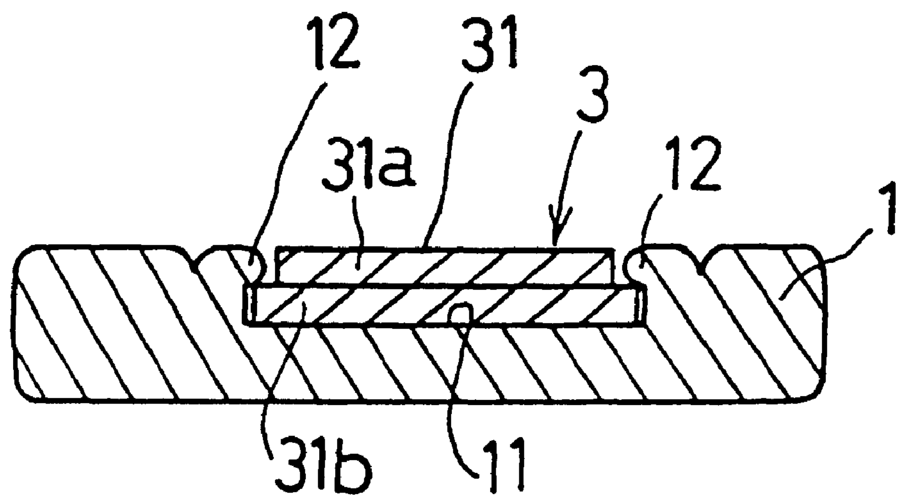
FIG. 5 is a cross-section of the wheel balance weight of the second embodiment.

A second embodiment of the balance weight is shown in FIG. 4 and FIG. 5. This wheel balance weight is comprised of a weight 1 and an engaging member 3. The weight body 1 has a recessed or concave engaging groove 11 at a central portion thereof on a surface opposing to the wheel and a pair of protruded portions 13 protruded toward the engaging groove 11 from the both side portions thereof. The engaging member 3 has one end portion 31 of a double construction formed by folding back an end of the metallic plate to have a opened side portion 31*a* and a bottom surface side portion 31*b*, and both side edge portions of the opened side portion 31*a* is removed to reduce the width.

The pawl portion 12 is formed, in the state where the one portion 31 of the engaging member 3 is fitted into the engaging groove 11 of the weight body 1, by caulking the both side portions defining the engaging groove 11 toward or over the one end portion 31 to form the pawl portions 12. Thus, the pawl portions 12 press the wide area of the one end portion 31 to the weight body 1.

According to the wheel balance weight of this embodiment, due to the folded or duplicate construction (31*a*, 31*b*)of the one end portion 31, the engaging member 3 has large resilient deforming ability, so that the wheel balance weight can be fixed to the rim portion of the wheel easily.

<Third Embodiment>

Figure 6:
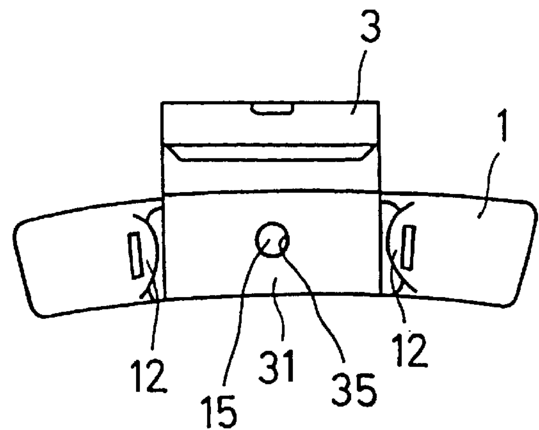
FIG. 6 is a plan view of a wheel balance weight of a third embodiment.
Figure 7:
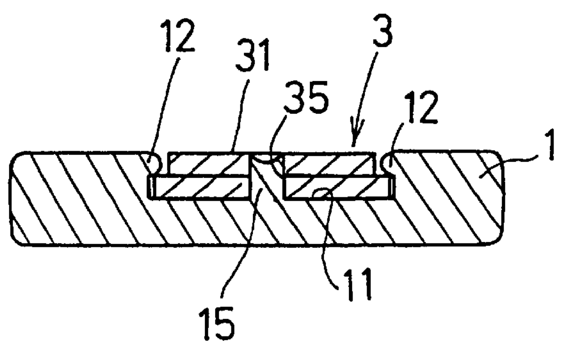
FIG. 7 is a cross-section of the wheel balance weight of the third embodiment.

A third embodiment of the wheel balance weight is shown in FIG. 5 and FIG. 6. This wheel balance weight is an improvement of the wheel balance weight of the second embodiment, and is comprised of a weight body 1 and an engaging member 3. The weight body 1 is provided with a first guiding portion 15 (a protrusion) protruded from a central portion of a bottom surface of an engaging groove 11, while the engaging member 3 is provided with a second guiding portion 35 (a through-hole) formed at a central portion of the one end portion 31 of double construction.

When the engaging member 3 is fixed to the weight body 1, the first guiding portion 15 is fitted into the second guiding portion 35 to position the one end portion 31 of the engaging member 3 within the engaging groove 11 of the weight body 1. Then, a head portion of the first guiding portion 15 is caulked over a periphery of the second guiding portion 35. Then, the protruded portion 13 is caulked over the side edge portion of the one end portion 31 to fix the engaging member 3 to the weight body 1.

According to the wheel balance weight of this embodiment, by cooperation of the first and second guiding portions 15 and 35, i.e. by insertion of the first guiding portion 15 into the second guiding portion 35, the positioning or fitting of the engaging member 3 to the weight body 1 becomes easy and secure.

<Fourth Embodiment>

Figure 8:
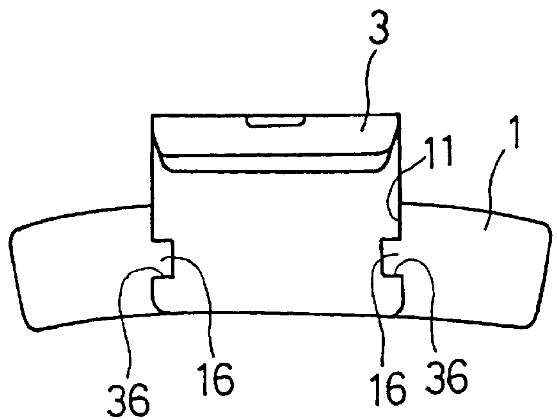
FIG. 8 is a plan view of a wheel balance weight of a fourth embodiment.

A fourth embodiment of the wheel balance weight is shown in FIG. 8. This wheel balance weight is an improvement of the wheel balance weight of the first embodiment, and is comprised of a weight body 1 and an engaging member 3. The weight body 1 has a first guiding portion 16 (a protruded bead) protruded from side edge portions of an engaging groove 11, while the engaging member 3 has a second guiding portion (a cut or recess) to which the first guiding portion 16 is fitted.

According to the wheel balance weight of this embodiment, by cooperation of the first and second guiding portions 16 and 36, i.e. by fitting of the first guiding portion 16 into the second guiding portion 36, the engaging member 3 can be positioned in the engaging groove 11 of the weight body 1 easy and securely. The first guiding portion 16 is also used as the pawl portion, and is caulked over the second guiding portion 36 after fitted into the second guiding portion 36.

<Fifth Embodiment>

Figure 9:
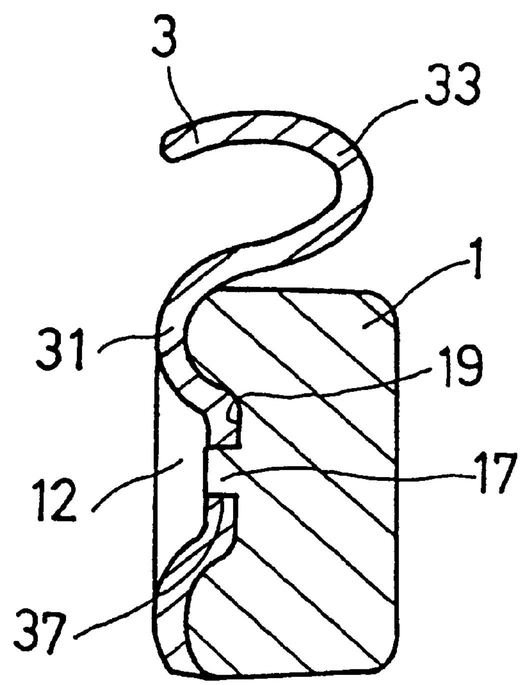
FIG. 9 is a cross-section of a wheel balance weight of a fifth embodiment.
Figure 10:
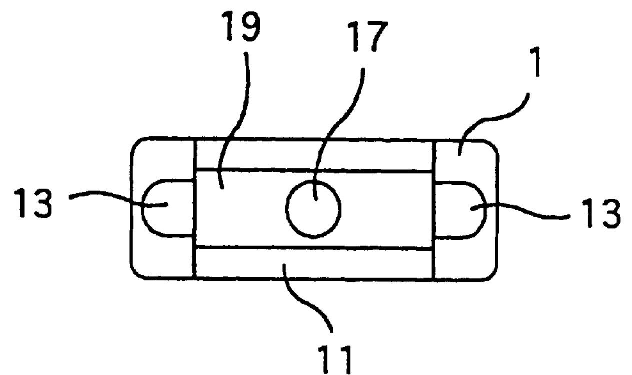
FIG. 10 is a plan view of a counter weight used in the fifth embodiment.
Figure 11:
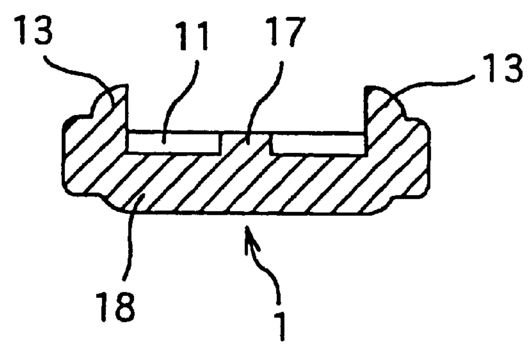
FIG. 11 is a cross-section of a counter weight used in the fifth embodiment.
Figure 12:
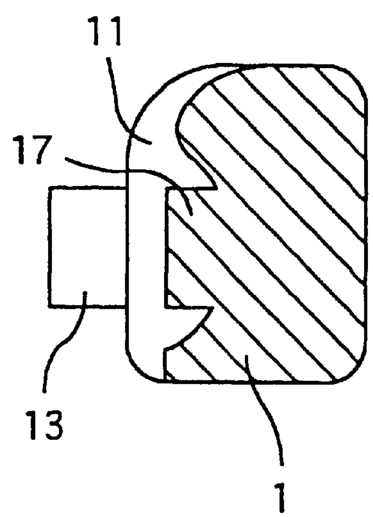
FIG. 12 is a cross-section of a counter weight used in the fifth embodiment.

A wheel balance weight of a fifth embodiment is shown in FIG. 9, and is comprised of a weight body 1 and an engaging member 3. The weight body 1 is, as shown in FIGS. 10, 11 and 12, has at an upper surface thereof an engaging groove 11 of a predetermined width and depth and extending in full width of the weight body 1, and at a lower surface thereof a lower protruded bead 18. On a bottom surface of the engaging groove 11, a deep groove or concave portion 19 having smaller width than the engaging groove 11 and same length as the engaging groove 11 is formed. At a central portion of the deep groove portion 19, a first guiding portion (protrusion) 17 is formed. At both opened end portions defining the engaging groove 11, a pair of protruded portions 13 are formed.

Figure 13:
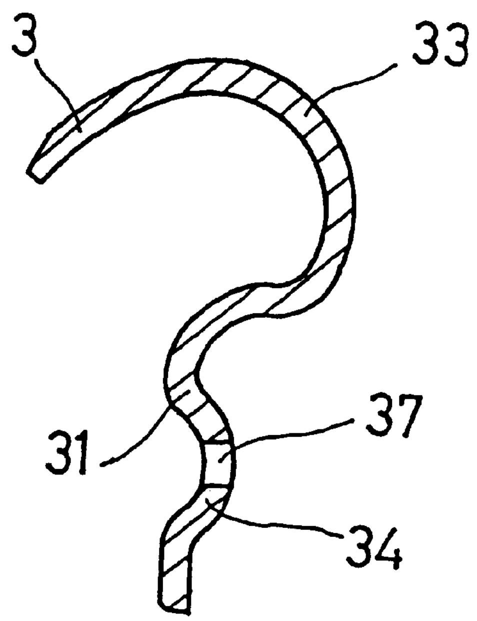
FIG. 13 is a cross-section of an angaging member used in a fifth embodiment.

The engaging member 3 is comprised of, as shown in FIG. 13, one end portion 31 to be fixed to an engaging groove 11 of the weight body 1, and a bent portion 33 bent to nip a periphery portion of a wheel rim. An intermediate portion 34 of the one end portion 31 in an extended direction thereof is bent to be concave, and a second guiding portion (through-hole) 37 is formed at a bottom portion of the concave portion 34.

When the one end portion 31 of the engaging member 3 is fixed to the engaging groove 11 of the weight body 1, the concave portion 34 of the one end portion 31 of the engaging member 3 is fitted into the deep groove portion 19 in the engaging groove 11 of the weight body 1. In this state, back portions of both protrusions 13 are caulked so that the caulked portion and the protrusion are pressed over the concave portion 34 of the one end portion 31 to form pawl portions 12. In addition, a head portion of the first guiding portion 17 is caulked over a periphery of the second guiding portion 35. Thus, the one end portion 31 of the engaging member 3 is fixed to the engaging groove 11 of the weight body 1.

According to the wheel balance weight of this embodiment, by inserting the first guiding portion 17 into the second guiding portion, in fixing the engaging member 3 to the weight body 1, the fitting of the engaging member 3 to the weight body 1 becomes easy and secure.

According to the wheel balance weight of the present invention, the engaging member can fixed to the weight body by caulking, in the state where the one end portion of the engaging member is fitted into the engaging groove of the weight body, the opened end portions defining the engaging groove over the one end portion of the engaging member. As a result, the fixing portions or area of the engaging member to the weight body increases, so that the engaging member can be fixed to the weight body firmly and securely.

What is claimed is:

1. A wheel balance weight attached to a rim of a wheel of an automobile, comprising:

a weight body having an engaging groove and caulkable opened end portions defining said engaging groove, and an engaging member having one end portion to be fixed in said engaging groove of said weight body and having another end for nipping a periphery of the rim of the wheel, said engaging member being fixed to said engaging groove of said weight body by pawl portions formed by caulking said opened end portions over said one end portion of said engaging member in a stage where said one end portion is engaged with said engaging groove, said weight body having deep groove portions at both sides of a bottom wall surface of said engaging groove, and said one end portion of said engaging member having sloped side edge portions sloped toward said engaging groove, said engaging member being fixed to said weight body in a state where said sloped side edge portions are fixed in said deep groove portions.

2. A wheel balance weight according to claim 1, wherein said weight body has a first guiding portion at a portion of side wall surfaces defining said engaging groove, and said one end portion of said engaging member has a second guiding portion guided by the first guiding portion when said one end portion of said engaging member is fixed to said engaging groove of said weight body.

3. A wheel balance weight attached to a rim of a wheel of an automobile, comprising:

a weight body having an engaging groove and caulkable opened end portions defining said engaging groove, and an engaging member having one end portion to be fixed in said engaging groove of said weight body and having another end for nipping a periphery of the rim of the wheel, said engaging member being fixed to said engaging groove of said weight body by pawl portions formed by caulking said opened end portions over said one end portion of said engaging member in a state where said one end portion is engaged with the engaging groove, said one end portion of said engaging member being formed in a duplicate construction by folding back an end of a metallic plate, and a portion of said one end portion facing a bottom wall surface of said engaging groove being wider than a portion of said one end portion facing said opened end portions to receive said pawl portions of said weight body.

4. A wheel balance weight according to claim 3, wherein said weight body has a first guiding portion at a portion of the bottom wall surface defining said engaging groove, and said one end portion of said engaging member has a second guiding portion guided by said first guiding portion when said one end portion of said engaging member is fixed to said engaging groove of said weight body.

5. A wheel balance weight attached to a rim of a wheel of an automobile, comprising:

a weight body having an engaging groove and caulkable opened end portions defining said engaging groove, and an engaging member having one end portion to be fixed to said engaging groove of said weight body and having another end for nipping a periphery of the rim of the wheel, said engaging member being fixed to said engaging groove of said weight body by pawl portions formed by caulking said opened end portions over said one end portion of said engaging member in a stage where said one end portion is engaged with said engaging groove, said weight body having a concave portion of constant width extending in a longitudinal direction of said weight body on a bottom wall surface of the engaging groove, and said one end portion of said engaging member has a convex portion extending over a full width thereof toward said concave portion on said engaging groove, said engaging member being fixed to said weight body in a stage where said convex portion is engaged in said concave portion.

6. A wheel balance weight according to claim 5, wherein said weight body has a first guiding portion at a portion of said concave portion defining said engaging groove, and said one end portion of said engaging member has at a top portion thereof a second guiding portion guided by said first guiding portion when said one end portion of said engaging member is fixed to said engaging groove of said weight body.

* * * * *